UNITED STATES PATENT OFFICE.

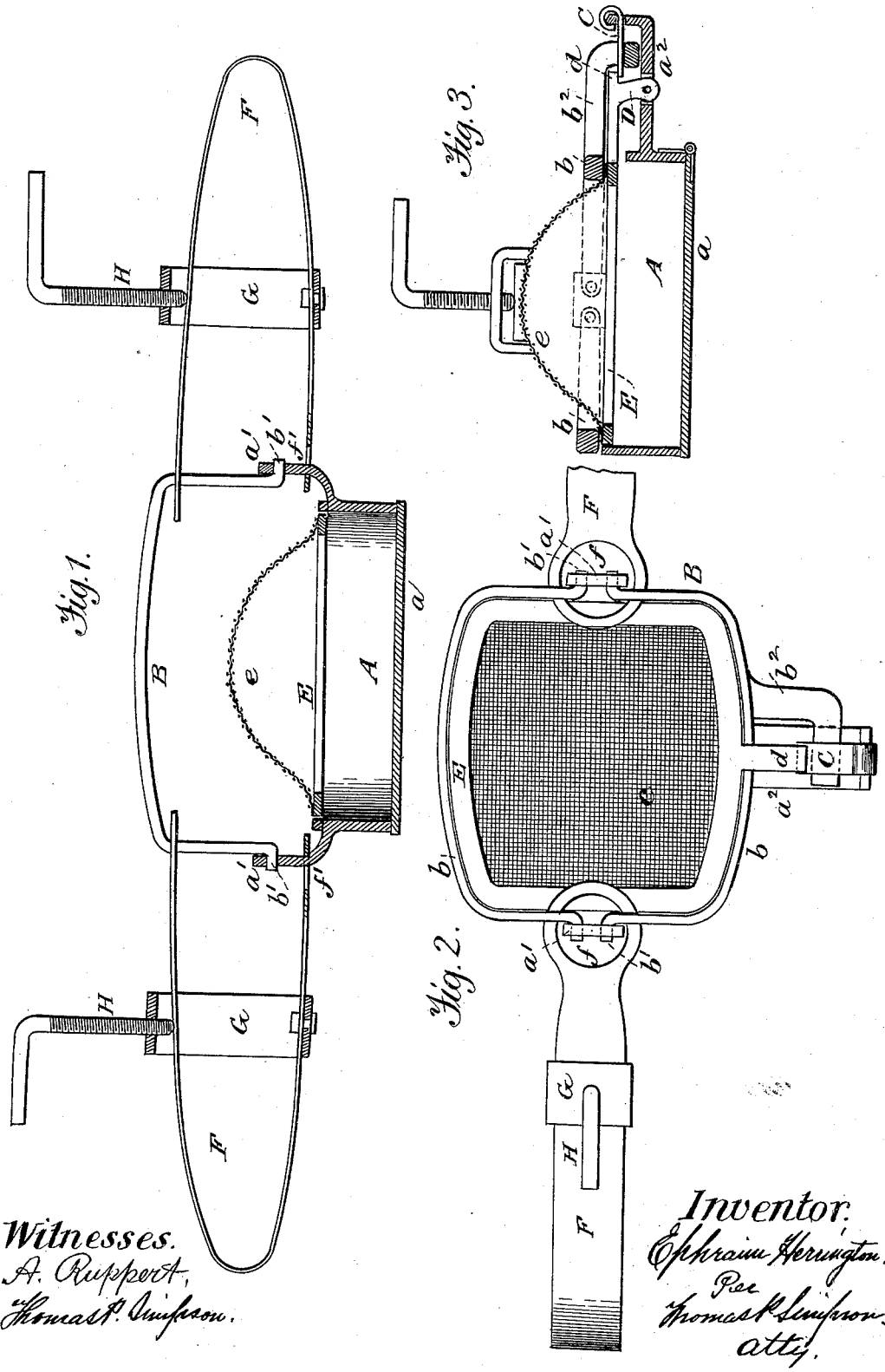

EPHRAIM HERRINGTON, OF MOUNT VERNON, ASSIGNOR OF ONE-HALF TO M. M. BUSH, OF TOWNS, GEORGIA.

LIVE-BAIT ANIMAL-TRAP.

SPECIFICATION forming part of Letters Patent No. 378,790, dated February 28, 1888.

Application filed September 19, 1887. Serial No. 250,095. (No model.)

*To all whom it may concern:*

Be it known that I, EPHRAIM HERRINGTON, of Mount Vernon, Montgomery county, Georgia, have invented an Improved Live - Bait Animal-Trap, of which the following is a specification.

The special object of the invention is to make an animal-trap adapted to be baited with a live animal, such as a pig, lamb, or fowl.

Figure 1 of the drawings is a vertical longitudinal section; Fig. 2, a plan view, and Fig. 3 a vertical transverse section.

In the drawings, A represents the hollow bait-receptacle, provided with the hinged bottom $a$, the upwardly-extending bearings $a'$ $a'$, to receive the trunnions $b'$ $b'$ of the clamping-jaws B, and the outward projection $a^2$, on which is pivoted the treadle or trip arm C. To the horizontal part of this projection is pivoted the lower end of the catch-arm D, having the horizontal stud $d$ to catch upon the trip-arm C, which is held up against it by extension $b^2$ of the spring-actuated clamp-arms $b$ $b$ in the usual way. The arm D is made integral with the ring E, which has a stiff convex wire-netting, $e$, so as to form a cover for the bait-receptacle A and to allow plenty of air to enter.

Behind the clamp-arms $b$ $b$ are arranged the springs F F, one or both, about which there is nothing new. They have end holes, $f f$, through which pass the clamp-arms $b$ $b$, and apertures $f'$ $f'$, through which pass the bearings $a'$ $a'$. These doubled or folding plate - springs are made very powerful, and require the exercise of much muscular strength to press them down, so as to set the trap; hence I use the rigid metallic bands G, riveted to the bottom of the spring. Over the spring I use the lever-screw H, which works through a corresponding thread in the band and bears upon the upper arm of the spring. By turning these lever-screws the springs are depressed, the clamp-arms $b$ $b$ drop apart into a horizontal position, and the trap is easily set. Then they are unscrewed, so as to give free play to the tension of the spring.

As soon as the wild animal presses on the netting $e$ of the cover, the ring E, being arranged within the walls of the receptacle A, yields sufficiently to trip the setting mechanism C D, when the clamp seizes the animal. The struggles of the wild animal turns over the trap, which is securely held to a tree, stone, or stake by a suitable chain or rope. The hinged bottom $a$ of the receptacle A now flies open and the live bait is at liberty.

It will be observed that the clamp-arms $b$ $b$ are somewhat differently constructed from those in the ordinary animal-trap, since they do not go directly under the trip-arm C, but have an extension, $b^2$, that is bent down and carried thereunder. This allows the arms $b$ $b$ to rest upon the edge of the bait-receptacle A, and causes the clamp to bite more quickly upon the animal which it is desired to catch.

Having thus described all that is necessary to a full understanding of my invention, what I claim as new, and desire to protect by Letters Patent, is—

1. In a live-bait animal-trap, the trip-arm C, hinged to a projection, $a^2$, of the receptacle A, in combination with a cover, E, having the integral hinged arm D, provided with the stud $d$, to catch on said trip-arm, as shown and described.

2. In an animal-trap, the combination, with a bait-receptacle having the bearings $a'$, and the clamping-jaws having the trunnions $b$ working in said bearings, of the metallic spring F, having the aperture $f'$, through which passes the part $a'$, the band G, riveted at the bottom to the lower arm of said spring, and the lever-screw H, working in a thread of said band, as and for the purpose specified.

EPHRAIM HERRINGTON.

Witnesses:
THOMAS P. SIMPSON,
A. RUPPERT.